US012681713B1

(12) United States Patent
Rajagopal et al.

(10) Patent No.: US 12,681,713 B1
(45) Date of Patent: Jul. 14, 2026

(54) SWIFT RESTORATION OF CONNECTIONS AND SESSIONS

(71) Applicant: Amazon Technologies, Inc., Seattle, WA (US)

(72) Inventors: Shyam Prasad Rajagopal, Redmond, WA (US); Marc Stephen Olson, Bellevue, WA (US); Sudhir Venkata Dachepalli, Bellevue, WA (US); Zhiping Zhang, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 185 days.

(21) Appl. No.: 17/809,840

(22) Filed: Jun. 29, 2022

(51) Int. Cl.
| | |
|---|---|
| *G06F 8/65* | (2018.01) |
| *G06F 11/14* | (2026.01) |
| *H04L 41/0654* | (2022.01) |
| *H04L 41/344* | (2022.01) |

(52) U.S. Cl.
CPC ........... *G06F 8/65* (2013.01); *G06F 11/1415* (2013.01); *H04L 41/0654* (2013.01); *H04L 41/344* (2022.05); *G06F 2201/805* (2013.01)

(58) Field of Classification Search
CPC .. G06F 8/65; G06F 11/1415; G06F 2201/805; H04L 41/0654; H04L 41/344
See application file for complete search history.

(56) References Cited

U.S. PATENT DOCUMENTS

| | | | | |
|---|---|---|---|---|
| 5,751,719 A * | 5/1998 | Chen | ........................ | H04L 1/187 |
| | | | | 370/473 |
| 7,062,515 B1 * | 6/2006 | Thomas | .............. | H04L 67/1095 |
| | | | | 707/951 |
| 7,484,055 B1 * | 1/2009 | Gupta | ................. | H04L 61/4505 |
| | | | | 711/100 |
| 2003/0097488 A1 * | 5/2003 | Bauman | ................ | H04L 69/162 |
| | | | | 719/328 |
| 2009/0171977 A1 * | 7/2009 | Park | ...................... | H04L 69/329 |
| 2014/0032964 A1 * | 1/2014 | Neerincx | ................ | H04L 69/40 |
| | | | | 707/634 |
| 2018/0176967 A1 * | 6/2018 | Somasandharam | ... | H04W 76/22 |
| 2021/0385550 A1 * | 12/2021 | Jothilingam | ........ | H04L 41/0806 |
| 2022/0247823 A1 * | 8/2022 | Cunningham | ........ | H04L 67/148 |
| 2023/0319148 A1 * | 10/2023 | Cunningham | ........ | H04L 67/148 |
| | | | | 709/227 |
| 2023/0333735 A1 * | 10/2023 | Glimcher | .............. | G06F 3/0664 |

* cited by examiner

*Primary Examiner* — Kamal M Hossain
(74) *Attorney, Agent, or Firm* — Knobbe, Martens, Olson & Bear, LLP

(57) ABSTRACT

Systems and methods are provided for swift restoration of a network connection and communication session between computing systems. A network connection between two computing systems may be established. When the network connection is interrupted, one computing system may send a reestablishment connection to the other computing system, and the network connection may be reestablished based on the reestablishment communication without establishing a second network connection.

20 Claims, 5 Drawing Sheets

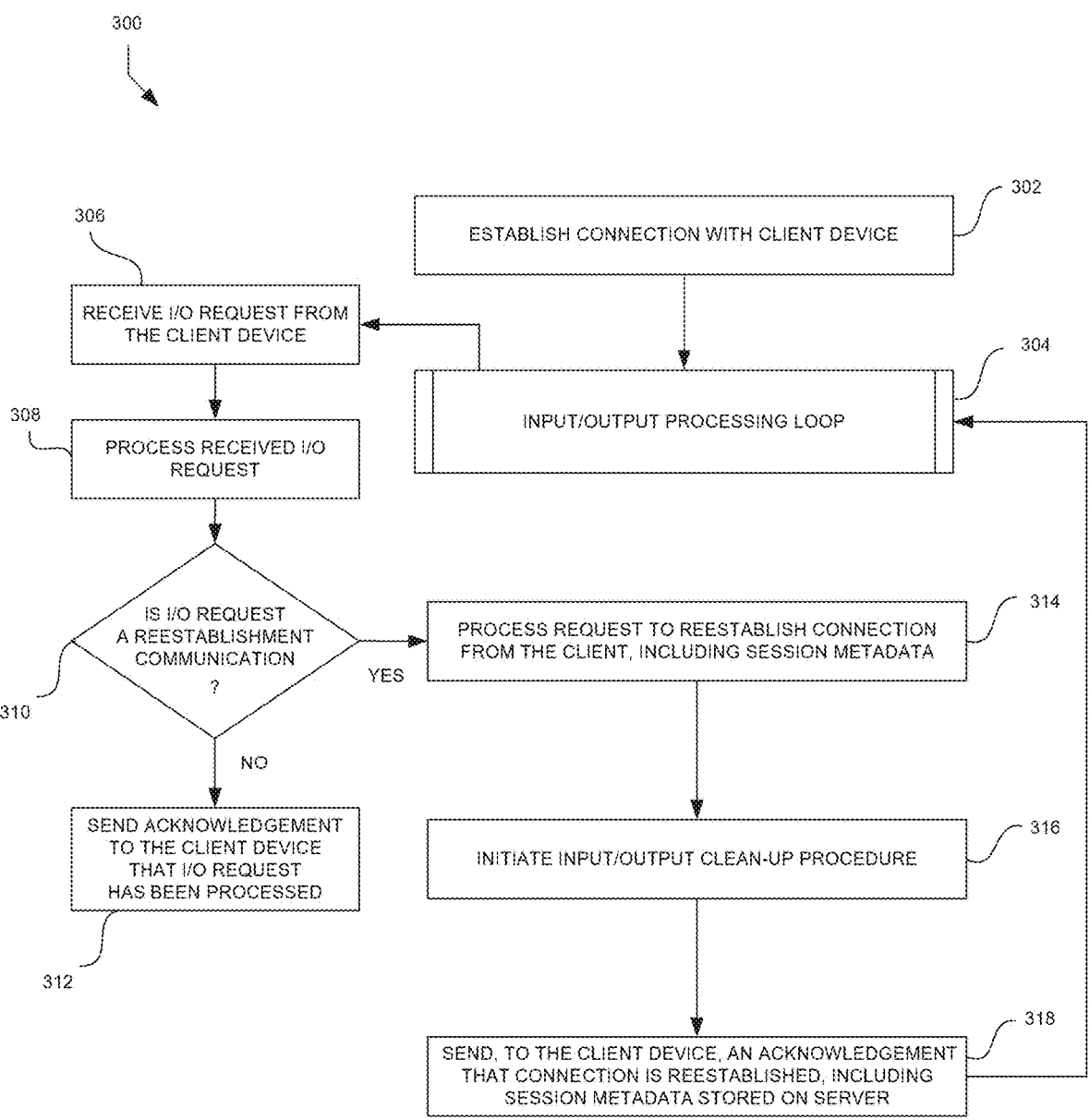

300

302
ESTABLISH CONNECTION WITH CLIENT DEVICE

306
RECEIVE I/O REQUEST FROM THE CLIENT DEVICE

304
INPUT/OUTPUT PROCESSING LOOP

308
PROCESS RECEIVED I/O REQUEST

310
IS I/O REQUEST A REESTABLISHMENT COMMUNICATION ?

YES

314
PROCESS REQUEST TO REESTABLISH CONNECTION FROM THE CLIENT, INCLUDING SESSION METADATA

NO

312
SEND ACKNOWLEDGEMENT TO THE CLIENT DEVICE THAT I/O REQUEST HAS BEEN PROCESSED

316
INITIATE INPUT/OUTPUT CLEAN-UP PROCEDURE

318
SEND, TO THE CLIENT DEVICE, AN ACKNOWLEDGEMENT THAT CONNECTION IS REESTABLISHED, INCLUDING SESSION METADATA STORED ON SERVER

*Fig. 3*

SWIFT RESTORATION OF CONNECTIONS AND SESSIONS

BACKGROUND

Computing devices can utilize communication networks to exchange data. Companies and organizations operate computer networks that interconnect a number of computing devices to support operations or to provide services to third parties. When a network connection is interrupted, these operations and services are disrupted until the connection is restored.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

FIG. 3 is a flow diagram of an example routine for swift restoration of a connection and session by a computing device that is in communication with a computing device associated with a cause of a connection restoration according to some embodiments.

DETAILED DESCRIPTION

Figure 1:
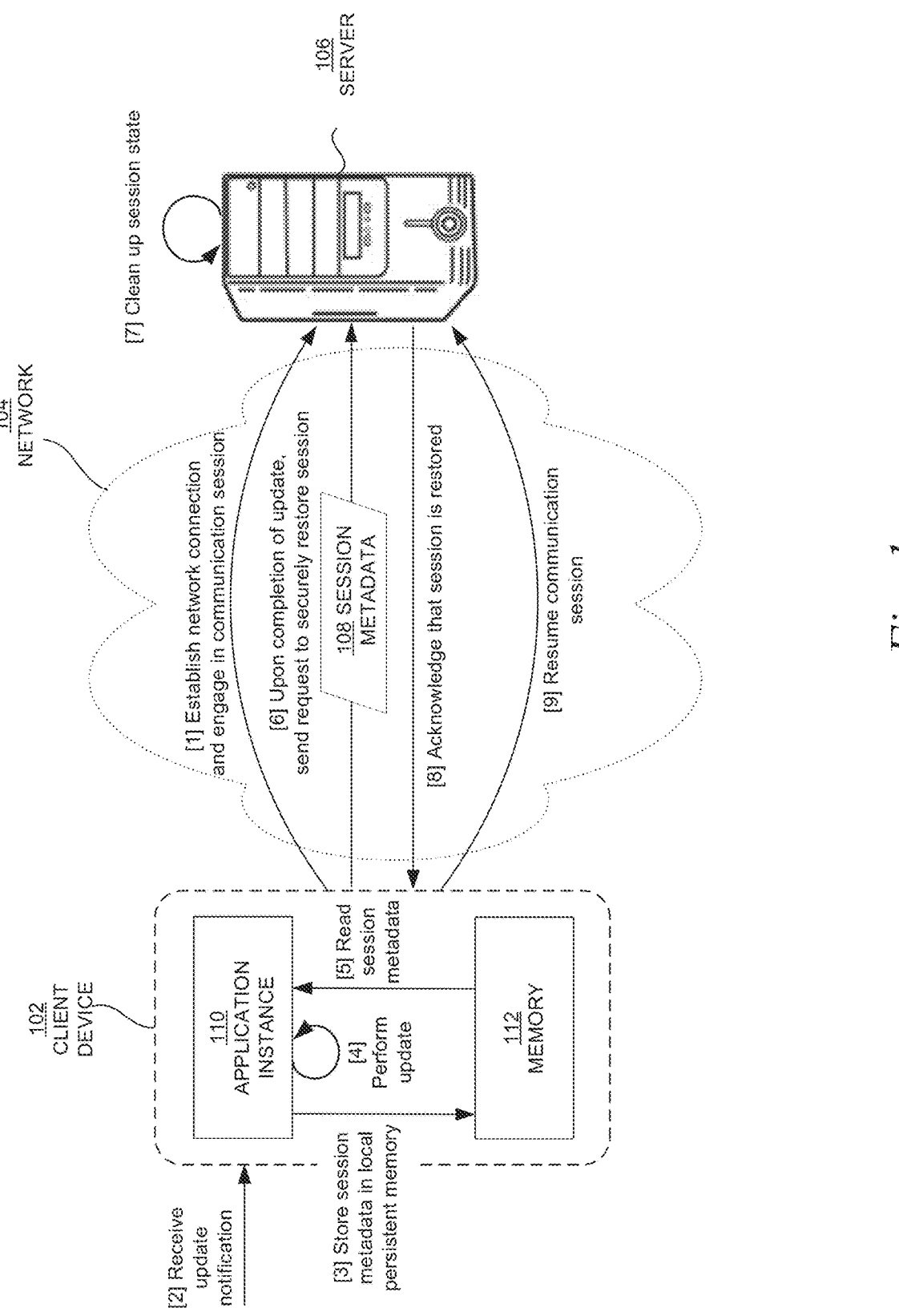
FIG. 1 is a block diagram depicting illustrative data flows and interactions between a client device and a server during a communication session in which an update occurs and a network connection is restored according to some embodiments.

Generally described, the present disclosure relates to swift restoration of network connections and sessions that have been interrupted. Computing devices utilize a communication network, or a series of communication networks, to exchange data. Such data is typically exchanged in network packets via network connections between a source device sending the packets and a destination device receiving the packets. As such, before data can be exchanged, a connection is established between the source device and destination device. When a connection is interrupted, the connection is re-established before data exchange is resumed.

As used herein, the term "connection" is used according to its normal and customary meaning, and generally refers to any network link or combination of network links that may be used to connect various communication endpoints on a network to one another, for example, by using routers, switches, and gateways. Such a link may be established by using one or more network protocols. A network protocol is a set of rules that determine how data is transmitted within a network. For example, the connections described in the present disclosure may use common network protocols such as, but not limited to, Transmission Control Protocol (TCP), User Datagram Protocol (UDP), and/or Scalable Reliable Datagram protocol (SRD).

As used herein, the term "session" is used according to its normal and customary meaning, and generally refers to any multi-way network connection enabling data exchange between two or more communication endpoints. Typically, a session includes one or more communications in each direction after establishment of the network connection over which the communications are sent. In the present disclosure, the terms "connection" and "session" may be used interchangeably to describe a network link between two particular endpoints. Although some examples will use a client device and a server as the two endpoints, the examples are not intended to be limiting or required. In some embodiments, connections and sessions may be established in other network architectures or between other types of endpoints, such as between two peer devices.

In conventional systems, a network connection of a computing device may be interrupted due to, among other things, installation of an update to communication software such that any in-memory process executed by the communication software will be terminated. When a network connection is interrupted, the connection is typically re-initialized via an "out-of-band" handshake. The handshake is considered "out-of-band" in that the handshake does not occur within the context of the previously-established network connection, but rather is used to effectively establish a new network connection. For example, the client device may need to register the server and a network endpoint address (and, in some cases other information such as a port) and send a handshake request via TCP to the server. The server would then need to validate the client address, register the client device and its own network endpoint address, and send a handshake response via TCP to the client device. Such an out-of-band handshake typically has a relatively high latency, resulting in delay in restoration of the connection and disruption of network communications. This effect can be compounded in cloud computing environments and other data center environments when a software update is rolled out across a significant number of computing devices (e.g., an entire fleet of computing devices or a large subset thereof). For example, a significant number of computing devices may be required to perform—substantially simultaneously or within a short period of time—a complete network connection establishment protocol for each network connection that existed before the update was rolled out. In such cases, the overall load on the communication network infrastructure may degrade performance and, in some cases, network outages may occur. In addition, when a new network connection is established in place of the interrupted network connection, it may not be possible to resume the communication session that was using the interrupted connection, thereby resulting in a loss of pending input/output requests and other communications that had not been processed or acknowledged.

Some aspects of the present disclosure address the issues noted above, among others, by using an "in-band" handshake for swifter restoration of a network connection. The handshake is considered "in-band" in that the handshake occurs within the context of the previously-established network connection. In some embodiments, after a connection is initialized, connection metadata is persisted on a client device. The connection metadata may include a connection identifier and/or other data fields necessary to identify the connection, such as a session identifier of the session for which the connection was established. The connection metadata may be stored, for example, in local persistent (or "p-state") memory which is unchanged when the connection is disrupted. In some embodiments, when a connection disruption is anticipated (e.g., when a real-time or "live" update is pushed to communication software, an application, or some other software component on the client device), the connection metadata may be stored just before the connection is interrupted. Subsequently, when the connection disruption is over (e.g., when the update is completed and the updated software begins executing again), the connection may be restored from the persisted metadata. Advantageously, communication may resume over the connection without first performing an out-of-band handshake, such as a TCP handshake. For example, the client device may resume communicating with the server using the connection metadata for the previously-initiated connection. In some embodiments, to notify the server that the connection is being resumed in this way, the client device may initiate an in-band handshake by sending a network packet containing the connection metadata to the server, notifying the server that the connection has been reset. The client device and server may then proceed to communicate via the restored connection without significant downtime.

Additional aspects of the present disclosure relate to methods of handling previously-received but unprocessed or otherwise unacknowledged data packets after the swift restoration of a network connection. Problems can arise, for example, when a client device sends communications, such as data requests (e.g., data "input/output" requests), to a server just before the connection is disrupted. To address this problem, when the server receives the in-band handshake request from a client device, the server may initiate a "clean-up" procedure for handling these pending requests, resolving any possible miscommunication in data exchange due to the connection being interrupted. For example, the clean-up procedure may include cleaning up residual memory from the session, refreshing session state, and the like. By then restoring a previously-established connection, the server can resume the existing session and resume handling these communications.

Various aspects of the disclosure will be described with regard to certain examples and embodiments, which are intended to illustrate but not limit the disclosure. Although aspects of some embodiments described in the disclosure will focus, for the purpose of illustration, on particular examples of network connections, client devices, computer memory, and server systems, the examples are illustrative only and are not intended to be limiting. In some embodiments, the techniques described herein may be applied to additional or alternative network restoration systems and methods. Additionally, any feature used in any embodiment described herein may be used in any combination with any other feature or in any other embodiment, without limitation.

Example Network Environment

FIG. 1 is a block diagram of an illustrative network environment depicting data flows and interactions between a client device 102 and a server 106 through a communication network 104 according to some embodiments. Illustratively, the client device 102 may be in communication with and interact with the server 106 to obtain, interact with, and/or store data managed by the server 106.

In some embodiments, the communication network 104 (also referred to simply as a "network") may be a publicly-accessible network of linked networks, possibly operated by various distinct parties, such as the Internet. In some cases, the network 104 may be or include a private network, personal area network, local area network, wide area network, global area network, cable network, satellite network, cellular data network, etc., or a combination thereof, some or all of which may or may not have access to and/or from the Internet.

A client device 102 may be or include any of a wide variety of computing devices, including personal computing devices, terminal computing devices, laptop computing devices, tablet computing devices, electronic reader devices, wearable computing devices, mobile devices (e.g., smart phones, media players, handheld gaming devices, etc.), and various other electronic devices and appliances.

In some embodiments, the client device 102 may be a host computing device comprising computing hardware configured to provide computing resources to customers. For example, the computing resources may be or include compute resources (e.g., execution of virtual machines, application software, and the like), storage resources (e.g., database storage, volume storage), other computing resources, or some combination thereof.

In some embodiments, the client devices 102 may communicate with the server 106 via an executable application instance 110 (e.g., a "headless" data processing application, and interactive application such as a web browser, etc.). The application instance 110 may obtain data from the server 106, from the client device's local storage, or from other sources. In some cases, the application instance 110 may also or alternatively generate data. The application instance 110 may communicate data to the server 106 for storage, further processing, or the like.

In addition to various other computing components not shown for ease of illustration (e.g., processors, volatile memory, user interfaces, and the like), the client device 102 may have persistent memory 112. For example, persistent memory may be located physically within a housing of the client device 102 such as on a processor chip, in a basic input-output system (BIOS) chip, or the like. In some cases, the persistent memory 112 may be coupled to, integrated with, or otherwise accessible to a network interface, such as an external network interface card that is coupled to the client device 102 via a cable, card interface, or the like. The persistent memory 112, also referred to herein as "p-state" memory, may be used to store network communication session metadata for use in swiftly restoring network connections as described herein.

In some embodiments, data processed by the server 106 may relate to the operation of network-based computing resources leased to, under the control of, or operating on behalf of various customers, such as customers executing software on one or more client devices 102. For example, the computing resources may include compute systems (e.g., server computing devices configured to execute applications or virtual machines, or server computing devices offered as "bare metal" to be configured as a customer wishes), data stores (e.g., object data storage systems, block storage systems, database management systems), networking resources (e.g., physical networking hardware, virtualized networks operating as overlay networks on a physical network substrate), other computing resources, or some combination thereof. The server 106 may receive information from a separate network computing provider that provides the subject computing resources, or the server 106 may be integrated with or otherwise part of a network computing provider.

The server 106 may be a logical association of one or more computing devices or systems. In some embodiments, the server 106 may include one or more web servers to provide network resources (e.g., web pages) to user devices, one or more database servers to provide data storage and access services, or one or more other servers, or some combination thereof. The server 106 (or individual components thereof) may be implemented on one or more physical server computing devices. In some embodiments, the server 106 (or individual components thereof) may be implemented on one or more host devices, such as blade servers, midrange computing devices, mainframe computers, desktop computers, or any other computing device configured to provide computing services and resources.

In some embodiments, the features and services provided by the server 106 may be implemented as web services consumable via one or more communication networks, such as local area networks, intranets, and/or the internet. In further embodiments, the server 106 (or individual components thereof) is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

With reference to the illustrative embodiment shown in FIG. 1, at (1), the client device 102 establishes a network connection and engages in a communication session with the server 106 through a network 104. The network connection and communication session may be established in order to facilitate communications between the client device 102 and server 106 for the purpose of running an application instance 110 on the client device 102. The session may proceed with various input and/or output communications (e.g., I/O requests) send from the client device 102 to the server 106. For example, the I/O requests may include data read and/or data write requests sent to the server 106. The server 106 may respond to data read requests by providing the requested data. The server 106 may respond to data write requests by acknowledging receipt of the data to be written and/or successful write of the data.

At (2), the client device 102 receives a notification to initiate an update. The update may, for example, be a process used to update application software on the client device 102 immediately or substantially immediately. For example, the update may include a software update and deployment to the executable application software that supports the application instance 110, such as application software that is managing or otherwise using the established network connection. Thus, the update may disrupt communications between the client device 102 and server 106 such that the network connection and communication session established at (1) is discontinued.

At (3), in response to receiving the update, and before the update initiates, the client device 102 stores communication session metadata 108 from the application instance 110 to local persistent memory 112. In some embodiments, the session metadata 108 may comprise a network connection identifier, a network or session connection key, a server identifier associated with the server 106, other information, or some combination thereof. The session metadata 108 includes at least sufficient information to identify the connection initially established between the client device 102 and server 106 at (1). In some embodiments, the session metadata 108 may always be stored in local persistent storage (e.g., even before an update has initiated); in these embodiments, at (3), the client device 102 checks to ensure that the stored session metadata is up to date. In some embodiments, the local persistent memory 112 in which the session metadata 108 is stored is internal to the client device 102 (e.g., random access memory or read-only memory). In other embodiments, the local persistent memory 112 may be external to the client device 102, such as an attachable network card or other attachable device. As used herein, the term "persistent" refers to the fact that the memory 112 is persisted even if the application instance 110 is interrupted or terminated, and is not meant to denote that the session metadata 108 must be stored in substantially permanent storage (e.g., on a hard disk).

At (4), the update is performed on the client device 102. As mentioned above, during the update, the network connection and communication session are interrupted. In some embodiments, due to the subsequent swift reconnection described in the present disclosure, there is no indication that an update is being performed on the client device 102, other than increased latency in interactions between the client device 102 and 106. For example, the application instance 110 may continue operating substantially as expected without receiving notification that the update is being or has been performed, that the network connection is being or has been interrupted, that the network connection is being or has been reconnected, etc.

At (5), upon completion of the update, the client device 102 reads the previously stored session metadata from memory 112. Then, at (6), sends to the server 106 a request to restore the network connection and communication session. The request may be referred to as a reestablishment communication. The request may be an in-band request that is sent to the server 106 based on stored session metadata 108, rather than a handshake for a new connection. In some embodiments, the request includes at least the previously stored session metadata 108 and serves as a signal to the server 106 to resume communications through the previously established network connection and communication session. In some embodiments, the request may be packaged along with other data input/output requests. Beneficially, by persisting the connection and session metadata and restoring the connection through an in-band request, downtime due to the update may be reduced significantly. Specifically, the in-band request avoids the time it takes to setup and perform an out-of-band handshake (e.g., a TCP request and acknowledgement) for connections across the network.

At (7), in response to receiving the request to restore the session, the server 106 initiates a clean-up procedure on the session. Beneficially, this avoids issues with duplicate input/output requests sent by the client device 102, because the client device 102 may be, for example, configured to re-send (or "re-play") I/O requests for which the client device 102 has not received an acknowledgement.

At (8), the server 106 sends an acknowledgement to the client device 102 that the communication session has been restored and that the communications may resume using that session. At (9), as described above, the client device 102 may re-send any unacknowledged I/O requests, thus resolving any possible issues from restoring the session. At this point, the client device 102 and server 106 may resume normal interactions through the restored session.

Example Routine for Update and Swift Connection Restoration

Figure 2:
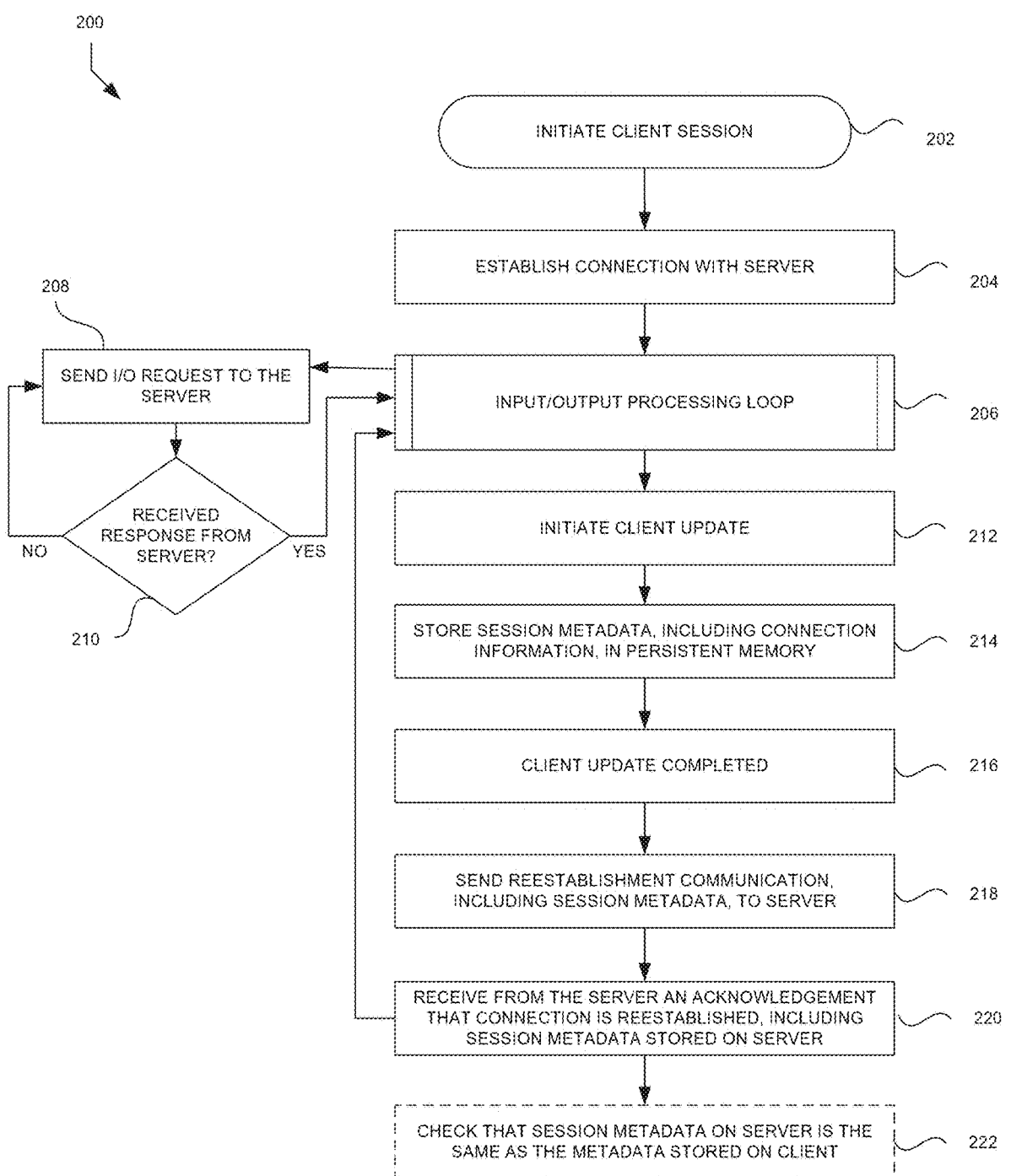
FIG. 2 is a flow diagram of an example routine for swift restoration of a connection and session by a computing device associated with a cause of a connection restoration according to some embodiments.

FIG. 2 is a flow diagram of an example routine 200 performed by a client device 102 for swift restoration of a network connection according to some embodiments. The routine 200 begins at block 202. In some embodiments, the routine 200 may begin in response to an event, such as a client device 102 boots up an executable software application. When the routine is initiated, one or more processors of a client device 102 may perform operations based on instructions of an executable application in memory (e.g., random access memory or "RAM") of the client device 102. In some embodiments, the routine or portions thereof may be implemented on multiple processors, serially or in parallel.

At block 202, the client device 102 may initiate a client session (also referred to herein as a "communication session"), wherein the client session relates to interactions between an executable application on the client device 102 and a server 106. At block 204, the client device 102 establishes a network connection with the server, allowing for interactions between the client device 102 and server 106.

At block 206, the client device 102 may enter a data input/output processing loop. While in this loop, at block 208, the client device 102 may send data input/output requests to the server (e.g., in response to programmatic operations within an application instance 110, in response to user selection within an application instance 110, etc.). For example, the client device 102 may send a data input request that instructs the server 106 to set a particular data item in a data store to a value. As a further example, the client device 102 may send a data output request that instructs the server to send to the client device 102 the value of a particular data item on the server (e.g., for processing by the application instance 110, for display to a user via a user interface, etc.).

At decision block 210, after sending an I/O request to the server, the client device 102 may wait for a response (or an "acknowledgement") regarding the previously sent I/O request. Such a response indicates to the client device 102 that the I/O request was received and processed by the server 106. If a response is received, that I/O request is cleared and the client device 102 resumes the normal I/O processing loop. If a response is not received, the client device 102 may return to block 208 to re-send the I/O request to the server 106.

At block 212, an update may be initiated to the client device 102 which disrupts the connection with the server and the client session. At block 214, in response to the update being initiated, the client device 102 stores session metadata, including connection information, in local persistent memory so that such metadata will be persisted, even when the session is disrupted by the update.

At block 216, the update to the client device 102 may be completed, which enables the client session to be restored. At block 218, in response to the completion of the update, the client device 102 may send a request to re-establish the connection and client session to the server. This reestablishment communication (also referred to herein as an in-band handshake request) includes the session metadata (or some portion thereof) previously stored in persistent memory at 214. In some embodiments, the reestablishment communication may also or alternatively include an encryption key, key exchange data, verification data, other security data, or some combination thereof. The reestablishment communication may serve as a notification to the server 106 that the client device 102 intends to resume communications with the server 106 using the previously established network connection. As a security measure, providing the session metadata or other security data in the reestablishment communication may help to ensure security of communication between the client device 102 and the server 106, providing proof that the systems have already executed a secure network connection handshake procedure. In some embodiments, the session metadata and/or other data in the reestablishment communication may be encrypted to ensure network communication security.

At block 220, the client device 102 may receive, from the server, an acknowledgment that the connection and client session have been restored, indicating to the client device 102 that the normal input/output processing loop may be resumed using the restored client session and connection. In some embodiments, the acknowledgment will include session metadata stored on the server. Optionally, at block 222, the client device 102 may perform a sanity check that the session metadata received from the server matches the locally stored session metadata.

Example Routine for Update and Swift Connection Restoration

FIG. 3 is a flow diagram of an example routine 300 performed by an server 106 for swift restoration of a session according to some embodiments. In some embodiments, the routine 300 may begin in response to an event, such when the server 106 receives from a client device 102 a request to establish a network connection and new client session. When the routine is initiated, one or more processors of a server 106 may perform operations based on instructions of an executable application in memory (e.g., random access memory or "RAM") of the server 106. In some embodiments, the routine or portions thereof may be implemented on multiple processors, serially or in parallel.

At block 302, the server 106 may establish a connection with a client device 102. At block 304, the server 106 enters a data input/output processing loop. Within this loop, at block 306, the server 106 receives an I/O request from the client device 102. At block 308, the server 106 reads and processes the received I/O request.

At block 310, the server may determine whether a received I/O request is a standard I/O request or if it includes a request to re-establish the network connection (e.g., an in-band handshake request after an update, including the previous session metadata 108). If the received request is a standard data input or output request, then the server 106 can process the request by performing the requested data input or output operation and, at block 312, send an acknowledgment to the client device 102 that the I/O request has been received and processed. If the received request includes a request to re-establish the network connection, then at block 314 the server 106 can process the request, re-establishing the network connection and restoring the client session by using the received session metadata 108.

At block 316, the server 106 initiates a procedure for cleaning up data from the session. As explained above, the client device 102 may re-send certain I/O requests due to receiving no acknowledgment that the request has been processed.

At block 318, the server 106 may send, to the client device 102, an acknowledgment that the network connection has been re-established and that the client session has been restored. Then, the server 106 may resume the normal input/output processing loop at block 304. Optionally, the acknowledgment sent at block 318 may also include the session metadata stored on the server 106, such that the client device 102 may check that the client and server are synchronized as to the restored client session.

Example Data Flows and Interactions

Figure 4:
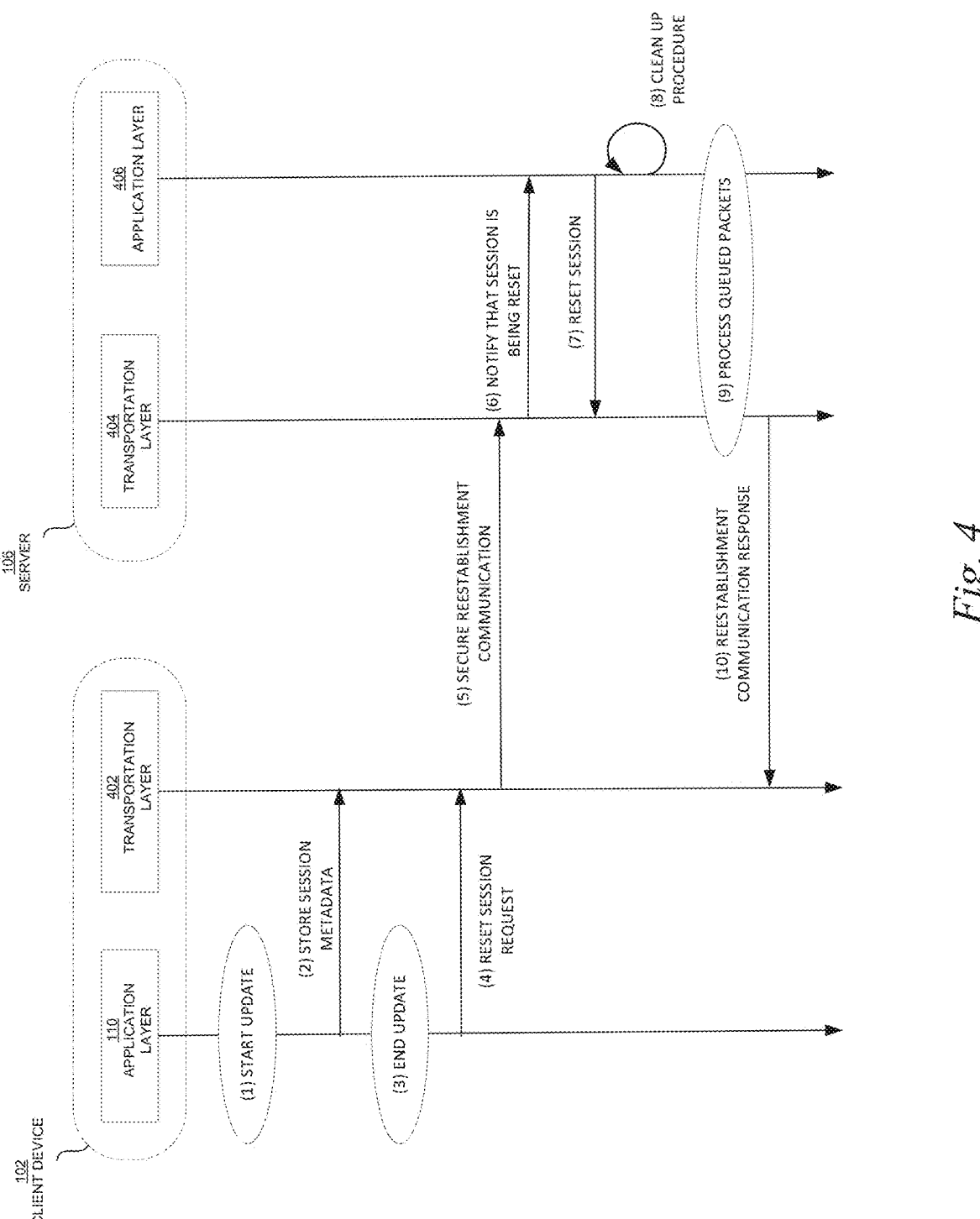
FIG. 4 is a block diagram depicting an example method of restoring a session between a client device and server according to some embodiments.

FIG. 4 is a block diagram depicting further illustrative data flows and interactions between a client device 102 and server 106 according to some embodiments. As illustrated in FIG. 4, a client device 102 may comprise various logical layers of computing resources, such an application layer 110 and a transportation layer 402. Each of the layers may be composed of physical hardware, virtualized hardware, software, or some combination thereof. In some embodiments, the application layer 110 may be responsible for locally executing a software application, such as by performing operations based on instructions of an executable software application and/or by processing user/input. In some embodiments, the transportation layer 402 may be responsible for communicating with the server 106, such as by sending and receiving data packets. Similarly, the server 106 may also comprise various logical layers of computing resources, such as a transportation layer 404 and an application layer 406. In some embodiments, the transportation layer 404 may be responsible for communicating with the client device 102, and the application layer 406 may be responsible for processing data input/output operations in a data store.

At (1), the client-side application layer 110 initiates an update, necessitating a disruption of a network connection between the client device 102 and server 106. At (2), the client device 102 ensures session metadata is stored in persistent memory, at a location in which the client-side transportation layer 402 can access the session metadata. For example, if the transportation layer 402 is or includes an internal or external network interface card with persistent memory, the session metadata may be maintained there.

At (3), the update is completed on the client-side application layer 110. Subsequently, at (4), the client-side application attempts to reset or reestablish the session by sending a request to the client-side transportation layer 402. In response, at (5), the client-side transportation layer 402 sends a reestablishment communication (e.g., an in-band handshake request), to the server 106 to notify the server that the session should be restored. The request is received by the server-side transportation layer 404.

In some embodiments, as shown, the reestablishment communication is a secure reestablishment communication. For example, the secure reestablishment communication may include the session metadata (or some portion thereof), an encryption key, key exchange data, verification data, other security data, or some combination thereof. As a security measure, providing the session metadata or other security data in the secure reestablishment communication may help to ensure security of communication between the client device 102 and the server 106, providing proof that the systems have already executed a secure network connection handshake procedure. In some embodiments, the session metadata and/or other data in the reestablishment communication may be encrypted to ensure network communication security.

At (6), after receiving the in-band handshake request, the server-side transportation layer 404 may route the request to the server-side application layer 406, notifying the application layer 406 that the session is being reset or reestablished. At (7), the server-side application layer 406 acknowledges to the server-side transportation layer 404 that the session has been restored. Then, at (8), the server-side application layer 406 may in some embodiments clean up any pending, un-processed data packets (i.e., data input/output requests) received from the client device 102 and stored in a queue during the session prior to the update. At (9), the server 106 may continue processing any queued data packets (i.e., those packets received by the server-side transportation layer 404 concurrently with or after the in-band handshake request). Finally, at (10), the server-side transportation layer 404 sends to the client device 102 a response to the in-band handshake request, thereby communicating to the client device 102 that the session has been restored.

Although various operations are shown and described in a particular sequential order, the sequence is for purposes of illustration and is not intended to be limiting, required, or exhaustive. In some embodiments, certain operations may be added, duplicated, excluded, performed in a different order, and/or preformed in parallel. For example, the server-side transportation layer 404 may send to the client device 102 a response to the in-band handshake request prior to, or in parallel with, flushing any pending, un-processed data packets associated with the session.

Figure 5:
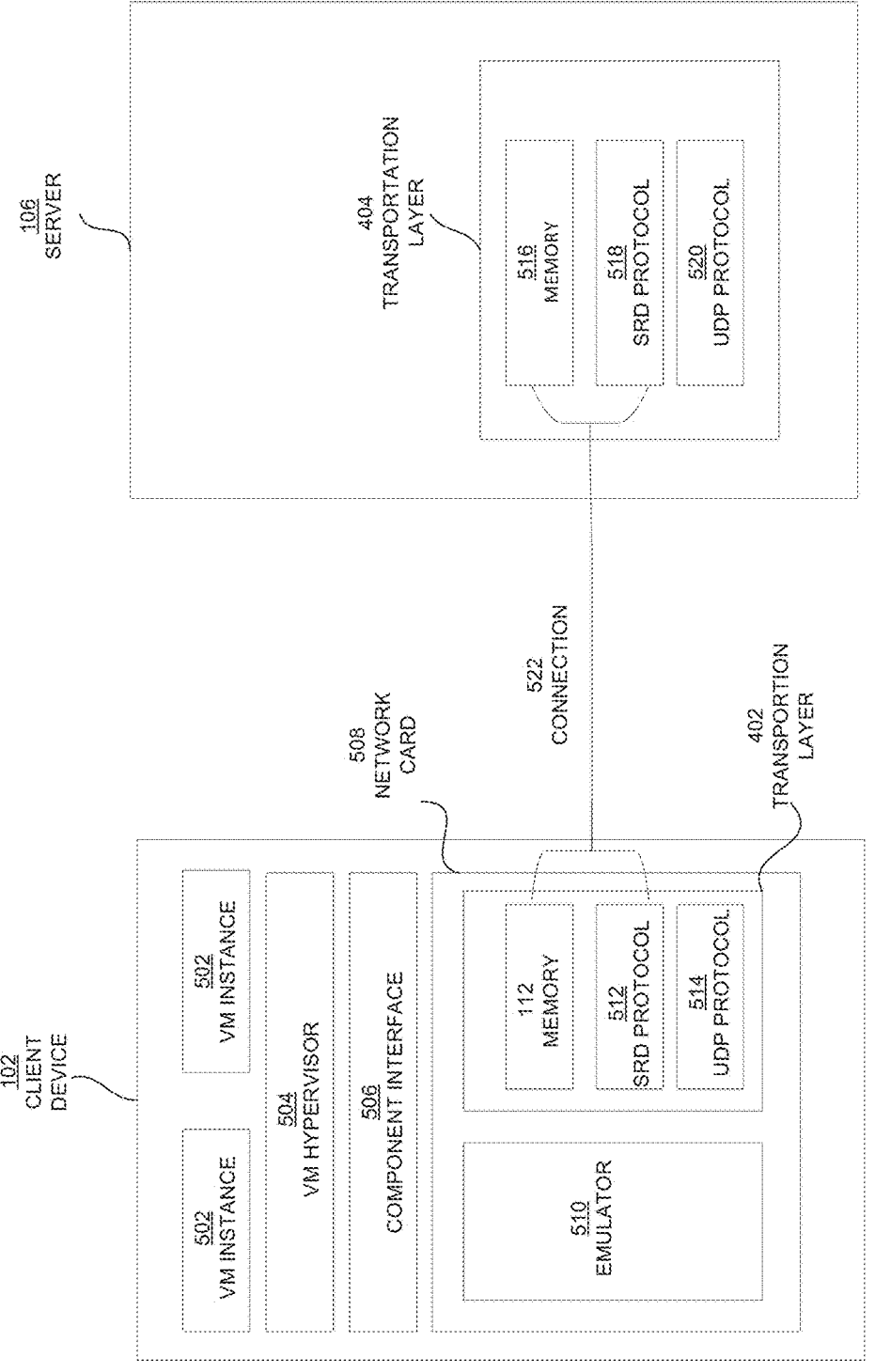
FIG. 5 shows illustrative interactions between an application, a memory device, and a server according to some embodiments.

FIG. 5 is a block diagram depicting an example implementation of a client-server system according to some embodiments. The example implementation illustrated in FIG. 5 can generally be described as a computing resource provider system, which relates to the operation of network-based computing resources leased to, under the control of, or operating on behalf of various customers. For example, as illustrated in FIG. 5, the computing resources may include virtual machines executing on a host device, such as a client device 102. Users may operate a client device 102 to access the information of and/or to generate information for storage on the server 106, for example via one or more virtual machine ("VM") instances. As another example, the computing resources may also or alternatively include data storage services for virtual machines, such as block storage for storage volumes that may be virtually attached to VM instances and accessed as though data is residing on a hard disk, solid state disk, or other physical volume of a client device.

As illustrated in FIG. 5, the system comprises a client device 102 and server 106. The client device 102 may comprise one or more VM instances 502. In some embodiments, a VM instance 502 may be a "headless" instance in which there is not an interactive user interface presented to a user, but rather application software that is executing on a schedule, on request, or in response to an event. In some embodiments, a VM instance 502 may include a graphical user interface through which a user of the client device 102 may interact with and manipulate application data stored on the server 106.

The one or more VM instances 502 may be supported by a VM hypervisor 504 (also commonly referred to as a virtual machine monitor or "VMM"). The VM hypervisor 504 is software that enables creating and running one or more virtual machines on a host device, such as a client device 102.

The client device 102 may further include a component interface 506, which allows for interfacing internal and/or external devices (e.g., a network card 508) with the client device 102. In various embodiments, the component interface 506 may include various types of USB standard ports, one or more PCIe standard ports, serial ports, parallel ports, PS/2 ports, VGA ports, FireWire ports, and/or infrared ports, or some combination thereof.

The client device 102 may further include a network card 508 integrated with, coupled to, or otherwise in communication with the client device 102 via the component interface 506. In the embodiment illustrated in FIG. 5, the network card 508 provides the architecture necessary for the client device 102 to communicate with the server 106. For example, the network card 508 may include an emulator 510, which enables the client device 102 to emulate a remote virtual machine. In various implementations, the emulator 510 may include various different VM emulators, such as, but not limited to, VMWare, VirtualBox, Parallels, QEMU, uEMU, *Eucalyptus*, and/or EmuVM.

The network card 508 may also include a client-side transportation layer 402, which manages communications between the client device 102 and server 106. The client-side transportation layer 402 may comprise memory 112, which stores data to be sent to the server 106 by the client device 102, as well as any data received by the client-side transportation layer 402. The client-side transportation layer 402 may further include instructions for communicating via various network communication protocols, such as SRD protocol 512 and/or UDP protocol 514, among others.

The server 106 may also include a server-side transportation layer 404, which manages communications to and from the client device 102. The server-side transportation layer 404 may similarly include memory 516 and instructions for communicating via various network communication protocols, such as SRD protocol 518 and/or UDP protocol 520.

The illustrated protocols are for purposes of example only, and are not intended to be limiting, required, or exhaustive of the network communication protocols with which swift connection restoration techniques may be used. In some embodiments, other protocols may be used, such as TCP/IP.

A connection 522 between the client device 102 and server 106 may be established between the respective transportation layers 402 and 404. For example, as illustrated in FIG. 5, a connection 522 may be established using SRD protocol. After the connection 522 is established, the client-side transportation layer 402 may exchange data stored in client-side memory 112 with the server-side transportation layer 404. Similarly, the server-side transportation layer 404 may exchange data stored in server-side memory 516 with the client-side transportation layer 402.

After an update is initiated, such as an update to a local software component of the client device 102 that is configured to facilitate access to storage services provided by the server 106 (e.g., virtualized storage volumes stored in network-accessible block storage), the client device 102 may store connection metadata in memory 112 of transportation layer 402 of the network card 508. After the update is completed, the connection metadata may be transmitted through connection 522 to the server 106 to swiftly re-establish the connection and resume data exchange between the client device 102 and server 106.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could." "might." "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising." "including." "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:
1. A system comprising:
   a server comprising a first volatile storage and a first computer processor; and
   a host device comprising second volatile storage, a persistent storage, and a second computer processor;
   wherein the host device is configured to:

establish a network connection with the server, wherein the network connection comprises one of a Transmission Control Protocol (TCP), User Datagram Protocol (UDP), or Scalable Reliable Datagram protocol (SRD) connection;
   send, to the server via the network connection, a plurality of input/output communications;
   initiate an update to executable software stored in the second volatile storage;
   in response to initiating an update to the executable software, store, in the persistent storage, connection metadata associated with the network connection, wherein the connection metadata comprises a connection identifier, a connection key, and a server identifier associated with the server;
   send to the server, in response to completion of the update to the executable software, a reestablishment communication comprising at least a portion of the connection metadata, wherein the network connection is reestablished based at least partly on the reestablishment communication and without establishing a second network connection; and
   resend, to the server, at least one input/output communication of the plurality of input/output communications based at least partly on a failure to receive an acknowledgement of the at least one input/output communication from the server; and
   wherein the server is configured to:
      receive, into a queue in the second volatile storage, the plurality of input/output communications from the host device via the network connection established with the host device, wherein the network connection is interrupted subsequent to receiving an input/output communication of the plurality of input/output communications;
      receive the reestablishment communication from the host device; and
      in response to receiving the reestablishment communication:
         reestablish the network connection;
         receive, into the queue, the at least one input/output communication resent from the host device; and
         initiate a cleanup procedure, wherein the cleanup procedure comprises:
            determining whether the queue includes one or more un-processed input/output communications that were received prior to receiving the reestablishment communication; and
            based on the queue including one or more un-processed input/output communications received prior to receiving the reestablishment communication, removing the one or more un-processed input/output communications received prior to receiving the reestablishment communication from the queue.
2. The system of claim 1, wherein the host device further comprises a network interface card, wherein the persistent storage is physically located on the network interface card, and wherein the executable software comprises a network-based storage client configured to communicate with executable network-based storage server software executing on the server.
3. The system of claim 1,
   wherein to establish the network connection with the server, the host device is configured to execute an out-of-band handshake according to one of: Transmission Control Protocol ("TCP"), User Datagram Protocol ("UDP"), or Scalable Reliable Datagram Protocol ("SRD"), wherein the network connection is reestablished without executing the out-of-band handshake a second time, and wherein the reestablishment communication is sent during execution of an in-band handshake to reestablishment the network connection.

4. The system of claim 1, wherein to send the plurality of input/output communications to the server, the host device is configured to use the connection identifier, the connection key, and the server identifier, and wherein to resend the at least one input/output communication to the server, the host device is configured to use the connection identifier, the connection key, and the server identifier.

5. A computer-implemented method comprising:

under control of a first computing system comprising persistent storage and one or more computer processors configured to execute specific instructions, initiating, by an application layer, a network connection with a second computing system, wherein the network connection comprises one of a Transmission Control Protocol (TCP), User Datagram Protocol (UDP), or Scalable Reliable Datagram protocol (SRD) connection;

exchanging, by a transportation layer, a first plurality of data communications with the second computing system via the network connection, wherein the first plurality of data communications comprises a first plurality of input/output requests;

storing, in the persistent storage, connection metadata representing one or more data items to be used in reestablishing communication with the second computing system via the network connection, wherein the connection metadata is accessible by the transportation layer;

determining that a network connection interruption has occurred;

determining that the network connection interruption has been resolved; and in response to determining that the network connection interruption has been resolved:

sending, by the transportation layer, a reestablishment communication to the second computing system based at least partly on determining that the network connection interruption has been resolved, wherein the reestablishment communication comprises at least a portion of the connection metadata, and wherein the network connection is reestablished based at least partly on the reestablishment communication without establishing a second network connection;

determining that no response was received from the second computing system for one or more input/output requests of the first plurality of input/output requests; and exchanging, by the transportation layer, a second plurality of data communications with the second computing system via the network connection subsequent to reestablishment of the network connection, wherein the second plurality of data communications comprises the one or more input/output requests for which no response was received.

6. The computer-implemented method of claim 5, wherein establishing the network connection with the second computing system comprises executing a handshake according to one of: Transmission Control Protocol ("TCP"), User Datagram Protocol ("UDP"), or Scalable Reliable Datagram Protocol ("SRD").

7. The computer-implemented method of claim 6, wherein the network connection is reestablished without executing the handshake a second time.

8. The computer-implemented method of claim 5, wherein storing the connection metadata in the transportation layer comprises storing connection metadata representing at least one of: a connection identifier of the network connection, a connection key for the network connection, or an identifier for the second computing system.

9. The computer-implemented method of claim 8, wherein exchanging the first plurality of data communications with the second computing system is based at least partly on the connection metadata.

10. The computer-implemented method of claim 9, wherein sending the reestablishment communication is based at least partly on a same portion of the connection metadata used to exchange the first plurality of data communications with the second computing system.

11. The computer-implemented method of claim 9, wherein exchanging the second plurality of data communications is based at least partly on a same portion of the connection metadata used to exchange the first plurality of data communications with the second computing system.

12. The computer-implemented method of claim 5, further comprising determining to send the reestablishment communication based at least partly on interruption of the network connection lasting for less than a timeout period associated with the network connection.

13. The computer-implemented method of claim 5, further comprising executing a virtual machine instance and a network-based storage client in separate computing processes of the first computing system, wherein the virtual machine instance uses the network-based storage client to access data stored on the second computing system, and wherein interruption of the network connection occurs based on installing an update to the network-based storage client during execution of the virtual machine instance.

14. The computer-implemented method of claim 5, further comprising determining to resend the one or more input/output requests in response to determining that no response was received from the second computing system for the one or more input/output requests.

15. A computer-implemented method comprising:

under control of a first computing system comprising computer-readable storage and one or more computer processors configured to execute specific instructions:

establishing a network connection with a second computing system, wherein the network connection comprises one of a Transmission Control Protocol (TCP), User Datagram Protocol (UDP), or Scalable Reliable Datagram protocol (SRD) connection, and wherein the network connection is associated with connection metadata representing one or more data items to be used in communicating with the second computing system via the network connection;

receiving, into a queue in the computer-readable storage, a plurality of communications from the second computing system via the network connection, wherein the network connection is interrupted after receipt of a communication of the plurality of communications;

receiving a reestablishment communication from the second computing system, wherein the reestablishment communication comprises at least a portion of the connection metadata, and wherein the network connection is reestablished based at least partly on the reestablishment communication without establishing a second network connection; and in response to receiving the reestablishment communication:

resuming receipt, into the queue, of communications from the second computing system via the network connection that has been reestablished; and initiating a cleanup procedure, wherein the cleanup procedure comprises:

determining whether the queue includes one or more un-processed communications that were received prior to receiving the reestablishment communication; and based on the queue including one or more un-processed communications received prior to receiving the reestablishment communication, removing the one or more un-processed communications from the queue received prior to receiving the reestablishment communication.

16. The computer-implemented method of claim 15, wherein establishing the network connection with the second computing system comprises executing a handshake according to one of: Transmission Control Protocol ("TCP"), User Datagram Protocol ("UDP"), or Scalable Reliable Datagram Protocol ("SRD").

17. The computer-implemented method of claim 16, wherein the network connection is reestablished without executing the handshake a second time.

18. The computer-implemented method of claim 15, further comprising storing the connection metadata, wherein the connection metadata represents at least one of: a connection identifier of the network connection, a connection key for the network connection, or an identifier for the second computing system.

19. The computer-implemented method of claim 18, further comprising sending, to the second computing system, a first plurality of acknowledgements for a first portion of the plurality of communications received into the queue, wherein the first plurality of acknowledgements are sent based at least partly on a portion of the connection metadata.

20. The computer-implemented method of claim 19, further comprising sending, to the second computing system, a second plurality of acknowledgments for a second portion of a second plurality of communications received into the queue subsequent to reestablishment of the network connection, wherein the second plurality of acknowledgments are sent based at least partly on a same portion of the connection metadata used to send the first plurality of acknowledgments to the second computing system.

* * * * *